United States Patent [19]

Pompier

[11] Patent Number: 5,211,783
[45] Date of Patent: May 18, 1993

[54] UNIT COMPRISING A TORIC TIRE

[75] Inventor: Jean-Pierre Pompier, Volvic, France

[73] Assignee: Compagnie Generale des Etablissements Michelin-Michelin & Cie, Clermont-Ferrand Cedex, France

[21] Appl. No.: 680,554

[22] Filed: Apr. 4, 1991

[30] Foreign Application Priority Data

Apr. 11, 1990 [FR] France .................. 90 04789

[51] Int. Cl.$^5$ .................. B60C 3/02; B60C 15/02
[52] U.S. Cl. .................. 152/453; 152/539; 152/544; 152/379.3; 156/133
[58] Field of Search ............ 152/379.3, 381.3, 381.4, 152/405, 410, 453, 454, 513, 516, 539, 544, 548; 156/121, 133

[56] References Cited

U.S. PATENT DOCUMENTS

| 474,423 | 5/1892 | Straus ........................ 152/539 |
| 4,110,141 | 8/1978 | Caravito ........................ 156/130.3 |
| 4,265,293 | 5/1981 | Curtiss et al. . | |
| 4,850,411 | 7/1989 | Seitz et al. ........................ 152/379.3 |

FOREIGN PATENT DOCUMENTS

| 0133150 | 2/1985 | European Pat. Off. ............ 152/453 |
| 1139619 | 10/1955 | France ................................ 152/454 |
| 2366944 | 9/1977 | France . | |
| 2619534 | 2/1989 | France ................................ 152/548 |
| 0020706 | of 1890 | United Kingdom ............. 152/379.3 |

*Primary Examiner*—Michael W. Ball
*Assistant Examiner*—Nancy T. Krawczyk
*Attorney, Agent, or Firm*—Oblon, Spivak, McClelland, Maier & Neustadt

[57] ABSTRACT

A tire of the closed torus type is made solid with a rim due to bead wires which hug a body tightly between themselves and the rim. At each lateral end of the rim, a shoulder is provided and extended by a seat. Diameter $\phi_s$ of the seat is always less than the shoulder diameter $\phi_c$, and the shape of the bead wire assumes the shape of the rim over at least a 45° sector.

6 Claims, 5 Drawing Sheets

UNIT COMPRISING A TORIC TIRE

BACKGROUND OF THE INVENTION

1. Field of the Invention

The present invention relates to tires, wheels and the mounting of tires on wheels.

2. Description of the Related Art

Conventionally, tires and wheels have been able to be separated from one another, and the wheel itself is fastened in a removable way to its hub. The wheel comprises a rim, which, with the tire, delimits the tire chamber filled with air under pressure. It also comprises a disk intended to be fastened to the hub. The rim is fastened to the disk either in a definitive way (rivets, welding), or in a removable way.

The tire is removable from the rim for permitting the necessary repair in case of a flat and for permitting the replacement of the tire when it is worn. This removal requires workshop equipment and, at each removal/mounting, it is necessary to perform a new balancing of the unit. The removal of the wheel in relation to the hub is very simple and within the capability of the user who must be able to perform this operation to perform a repair: in case of a flat, he removes the wheel concerned and mounts a spare wheel.

The association of the tire and its rim entails several problems. To assure the fluid tightness of the unit, and also to be able to transmit a torque, there is always a squeezing between the tire and the rim, more specifically between the lower face of the bead of the tire and the seat of the rim. The precise position of the bead on its seat is determined by the rim flange which acts as a stop against which the bead is flattened by the inflation pressure.

But, because of the squeezing on the seat, the exact position of the bead is poorly controlled: the plane that it makes, indicated for example by a plane tangent to the bead wire, cannot be absolutely parallel to the rim edge. The bead wire cannot be perfectly concentric to the seat of the rim even in the absence of any defect of shape of the tire. In driving, a wearing of the tire sometimes appears, caused by slight relative movements of it in relation to the radially upper end of the rim flange.

The constant increase in the performances of motor vehicles, in particular passenger cars, and the constant increase in the quality of the behavior of them necessitates shrinking ever more the production tolerances of tires. It is found that the mounting of the tire on its rim can obscure the performances of the tire: when the behavior of a vehicle is rated, differences can be observed that are as great, indeed greater between two runs with the same tire or tires that have been simply removed then remounted between the runs, than between runs with different tires that are being sought to be classified. This shows the precision, the fineness of reaction that is expected from the tires, and this also illustrates the difficulties that there are in improving the behavior of the vehicles if the mounting of the tire on the rim is insufficiently controlled.

SUMMARY OF THE INVENTION

Accordingly, an object of this invention is to design a novel unit in which the tire is mounted at the factory on its rim, and consequently can no longer be removed, to control with great precision the quality of the tire/rim association. The removal of the tire in relation to the vehicle is then transferred elsewhere, for example between rim and wheel disk or between wheel and hub.

The present invention relates to a tire and rim unit comprising a tire which is a closed torus type tire and a rim which supports the tire. The unit comprising a carcass for reinforcing the tire, the carcass forming a closed torus; and a pair of bead wires each of which is positioned on the inside of the carcass near lateral ends of the rim for tightly securing the carcass between the bead wires and the rim, the tire being immobilized on a radially exterior surface of the rim by the bead wires. Wherein, in a cutting plane containing an axis of rotation of the tire and rim unit, the position of the bead wire in relation to the rim, at each of the lateral ends of the rim, is defined by a shoulder provided on the rim and extended axially outward by a seat, the seat being entirely situated radially at a diameter which is less than a diameter of the shoulder; a lower diameter which is measured from under the bead wire is less than the diameter of the shoulder; the bead wire assumes a shape of the seat of the rim over at least a 45° swept sector which is displaced toward the interior of the rim from a line which is perpendicular to the axis of rotation of the tire and rim unit and dropped from a center of gravity of the bead wire; and an angle $\alpha$, which is an angle measured in relation to a straight line perpendicular to the axis of rotation that a first line tangent to the carcass makes at a position where the first tangent line leaves the bead wire on an axially exterior side of the tire, being less than an angle $\beta$, which is an angle measured in relation to a straight line perpendicular to the axis of rotation that a second line tangent to the carcass makes at a position where the second tangent line leaves the bead wire on an axially interior side of the tire.

In this design, the rim is designed as a wearing part, and must be replaced at the same time as the tire, which is not a handicap on an economic level because the additional cost of a tire mounted on a rim and factory-balanced is approximately compensated for by the value of all the operations eliminated, i.e., the removal of the old tire, the mounting of the new tire and the workshop balancing.

In addition, the fact of associating tire and rim in a single product offered on the market increases the possibilities of installing accessories with which tires are or will be increasingly provided: sensors of inflation pressure, of temperature, and components for a tire monitoring device, supports or other devices to improve the ability to drive without pressure, elements to change the inflation pressure of the tires on demand. By the fact of this association, it is also easier to incorporate inert solids in the tire to reduce the interior volume of it. This reduction in interior volume is sought in the case where it is desired to produce a variable pressure tire: actually, with a given air amount for equipment making it possible to increase or reduce the pressure, the actual change in the internal pressure of the tire will be all the faster as its internal volume of air is reduced.

Another advantage of the invention is linked to the entire elimination of the rim edge: the side wall height that is available to assure the flexibility of the tire by bending of the side wall is greater; it is therefore possible to adopt smaller H/B ratios without reducing comfort, and therefore to increase the volume available on the inside of the wheel, particularly for the brakes, or for anchoring of the suspension arms or to house the pivots. From another view, it is possible to reduce the overall diameter of the tire to increase the effective volume of the vehicle thus equipped.

To improve the quality of the rim/tire association further, the invention also provides for a production process in which the rim is used as a support for producing the tire. All the constituent elements of the raw blank of the future tire are placed on the rim, then the rim supporting the raw blank is introduced into a mold that is adapted to the edges of the rim, the interior of the tire then being filled with a fluid under a pressure that is suitable for the molding and vulcanizing phase.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
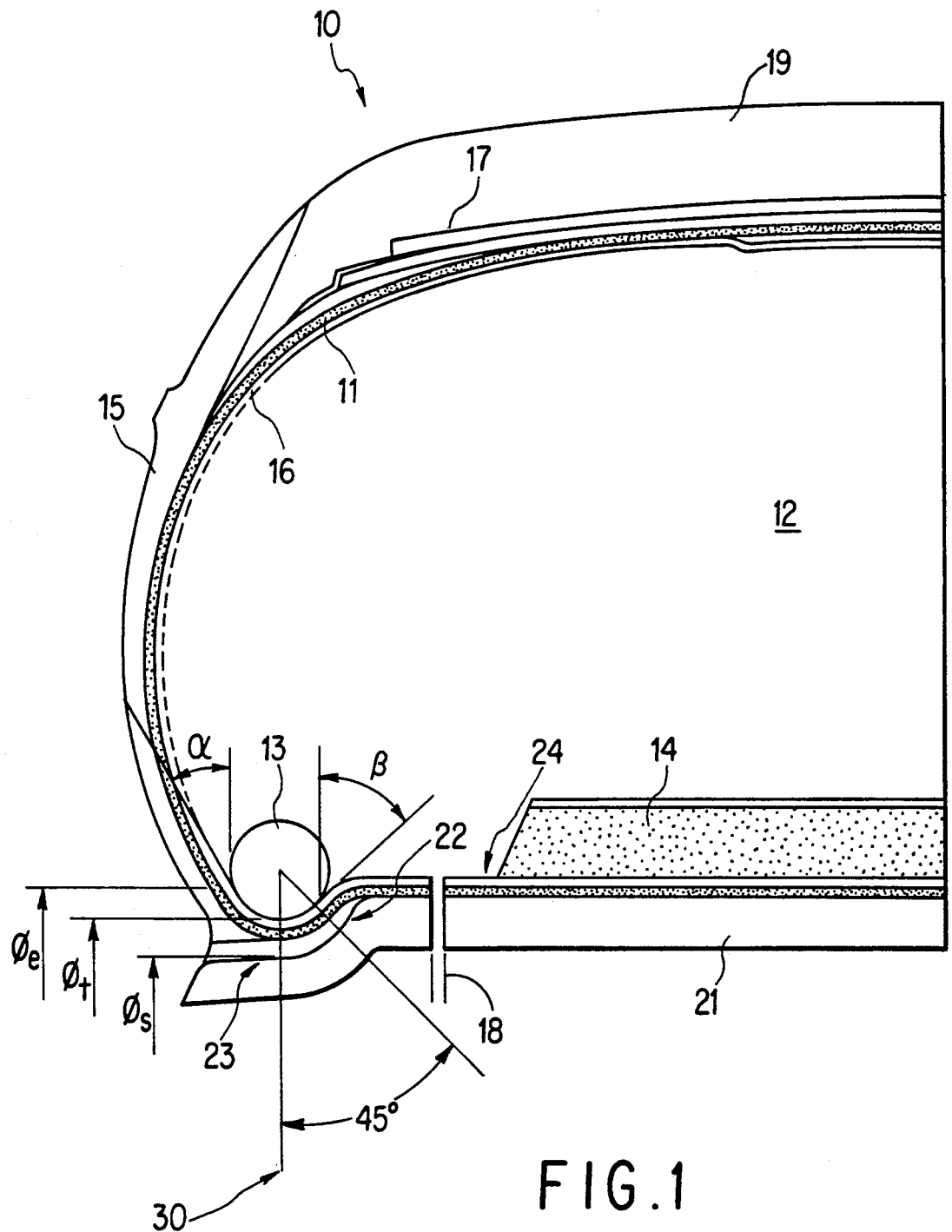
FIG. 1 is a radial section of a unit according to the present invention.

Referring now to the drawings, wherein like reference numerals designate identical or corresponding parts throughout the several views, and more particularly to FIG. 1 thereof, in FIG. 1, a tire 10 of the closed torus type mounted on a rim 21 is shown. A tire which entirely delimits the chamber subject to inflation pressure 12 is called a closed torus tire, whereas ordinary tires must be associated with the rim to define the chamber subjected to the inflation pressure. The tire 10 is reinforced by a carcass 11 which goes completely around the tire. Seen in radial section, this carcass also forms a torus. The unit has two bead wires 13 placed inside carcass 11, near the axial ends of rim 21.

Carcass 11 is hugged tightly between the bead wires 13 and rim 21. At each lateral end of rim 21, a shoulder 22 is found extended axially outward by a seat 23. Diameter $\phi_s$ of seat 23, measured at any place on it, is always less than the diameter of shoulder $\phi_c$. In addition, the shape of bead wire 13 assumes the shape of the seat of the rim at least over a 45° sector defined as follows: an imaginary line 30 is drawn perpendicular to the axis of rotation and dropped from the center of gravity of bead wire 13, and a rotation of 45° is performed around the center of gravity on the axially interior side of the imaginary line 30. In the present invention, bead wire 13 constitutes not only a reinforcement element that must enjoy sufficient mechanical characteristics but the role of the bead wire also consists in defining a shape which accompanies the tire at the place where it leaves contact with rim 21.

Thus, therefore, not only must the shape of bead wire 13 correspond to the shape of rim 21 as explained above but also beyond being separated axially outward from it, the radially lower edge of the bead wire must be rounded to make it possible for the body to be wound correctly then to leave the bead wire with an appropriate radial orientation upward.

The shape of the carcass ply at the places where it leaves contact with the bead wire is characterized by angles $\alpha$ and $\beta$, $\alpha$ for the axially exterior side of the bead wire, and $\beta$ for the axially interior side of the bead wire.

Angles $\alpha$ and $\beta$ are both measured in relation to a straight line perpendicular to the axis of rotation. "$\alpha$" is the angle that the tangent to the carcass ply makes, in relation to this straight line perpendicular to the axis of rotation, at the place where it leaves the bead wire on the axially exterior side of the tire. "$\beta$" is the angle that the carcass ply makes, in relation to the perpendicular straight line, at the place where it leaves the bead wire on the side axially interior to the tire. According to the invention, angle $\alpha$ must always be less than angle $\beta$. Preferably, $\beta$ is between 30° and 80°. The values of 30° for $\alpha$ and 45° for $\beta$ have proved particularly advantageous.

This condition is intended to guarantee that the forces transmitted to the bead wire by the carcass ply is a resultant R which is always oriented axially toward the interior of the tire. Actually, by assuming that stresses $T_1$ on the axially interior side of the bead wire and $T_2$ on the axially exterior side of the bead wire are equal, which is correct except for the forces of friction, this angle difference guarantees that the forces to which the bead wire will be subjected will always be oriented toward the interior of the tire.

The bead wire must be dimensioned so that lower diameter $\phi_t$ measured under the bead wire is always less than diameter $\phi_c$ measured at the shoulder of the rim. In that way, the bead wire is always resting on the rim and its positioning is accurately assured.

In use, it is possible that resultant R of the forces applied to the bead wire are oriented axially outward in the zone corresponding to the contact of the tire with the road. However, everywhere else, the orientation of the forces applied to the bead wire is always directed toward the interior of the rim. The overall resultant of the actions on the bead wire will always be oriented toward the interior of the rim and it is therefore not possible for the bead wire to be able to leave its position.

Between the two shoulders 22, the rim forms a cylindrical zone 24 that can constitute a support in the radial direction for the tread in case of driving with insufficient pressure. Very advantageously, it is possible to place at this location a rubber cushion 14 situated between the two bead wires, adjacent to the rim. This cushion 14 is intended to constitute a support for the tread.

In the standard production processes of tires, there are always one or more transfers or manipulations of the raw blank of the tire. At this stage of the production, since the rubber has not yet been vulcanized, the mechanical properties of the blank are mediocre. The manipulations of the blank are therefore able to alter the blank, by modifying its dimensions, and/or by slightly changing the position of certain constituents in relation to others. The invention provides for producing the unit consisting of a tire and a rim by using the rim as a support of all the elements from the beginning of the production.

Rim 21, therefore, serves as a production drum, on which the various constituents will be wound, in the order required in the structure of the tire.

In FIGS. 2 to 6, a production station is seen comprising essentially rim 21 and, on both sides of it, semicylindrical supports 210. Only an axial half has been represented in the diagrams of FIGS. 2 to 7. The unit which has just been described can be produced in the following manner. On rim 21, there is first wound, in a turn, a complex 150 comprising sides 15 and carcass ply 11. Then in a second winding, the layer of interior rubber 16 is deposited. Preferably, the latter has undergone a prevulcanization treatment because it will serve as inflation membrane during vulcanization. It must therefore be fluidtight, and chemically insensitive to the heat exchanging fluid which will be used.

Figure 2:
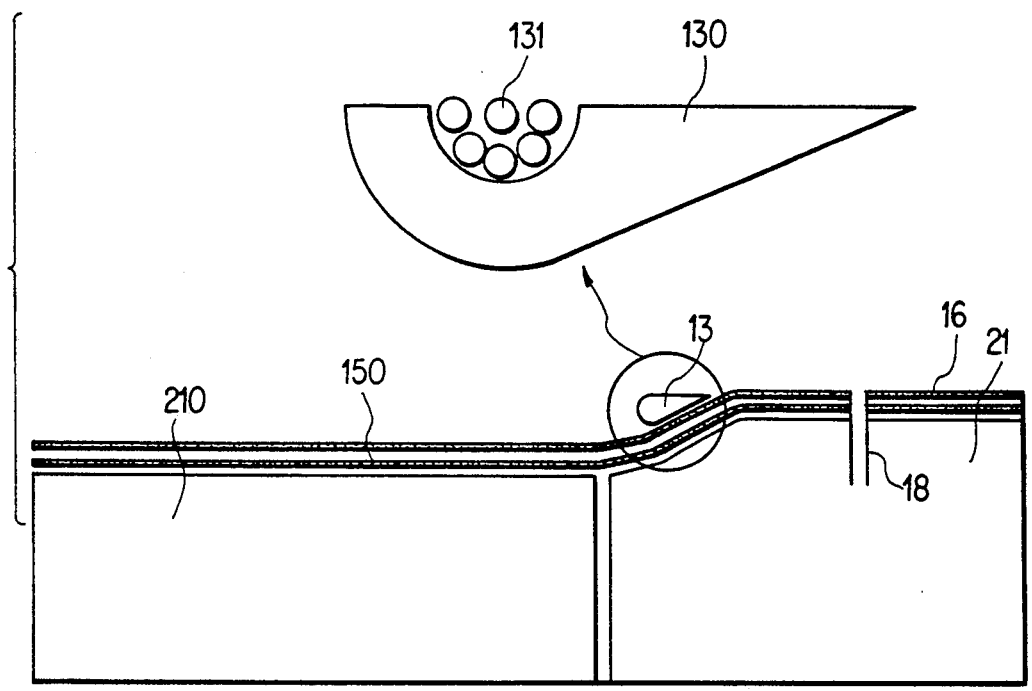
FIGS. 2–7 diagram the production of a unit according to the invention.

At the subsequent stage, cushion 14 is wound on rim 21 and bead wires 13 are placed. They can be made separately or else constituted on the spot in the following manner: a section 130 embodying the desired shape for the radially interior face of the bead wire is wound, the section appearing in the shape of a split ring. On the inside of this section, several turns of a wire 131 are wound, up to the mechanical strength that it is desired to obtain. This phase of the production is illustrated by FIG. 2.

Figure 3:
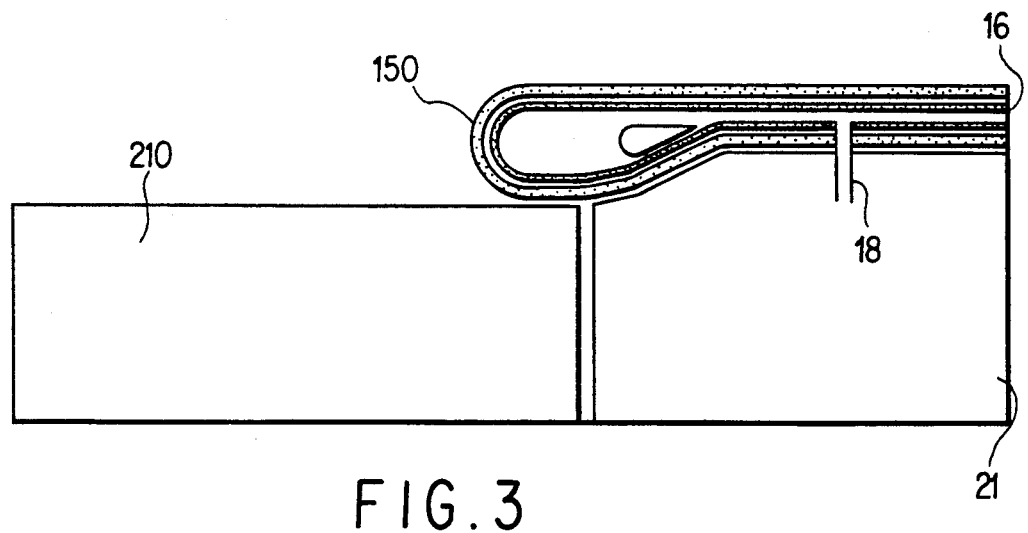

Then, the interior rubber layer is raised to perform a welding by superposition, so that this welding will be found approximately at the center of the tread, as appears in FIG. 3. In the same way, the two ends of carcass ply 11 are raised to perform, here also, a welding by superposition. Then, chamber 12 thus constituted is subjected to a slight inflation pressure to give it a sufficient shape to fit a ring 170 produced elsewhere, comprising top layers 17 and tread 19 (see FIG. 6).

Figure 4:
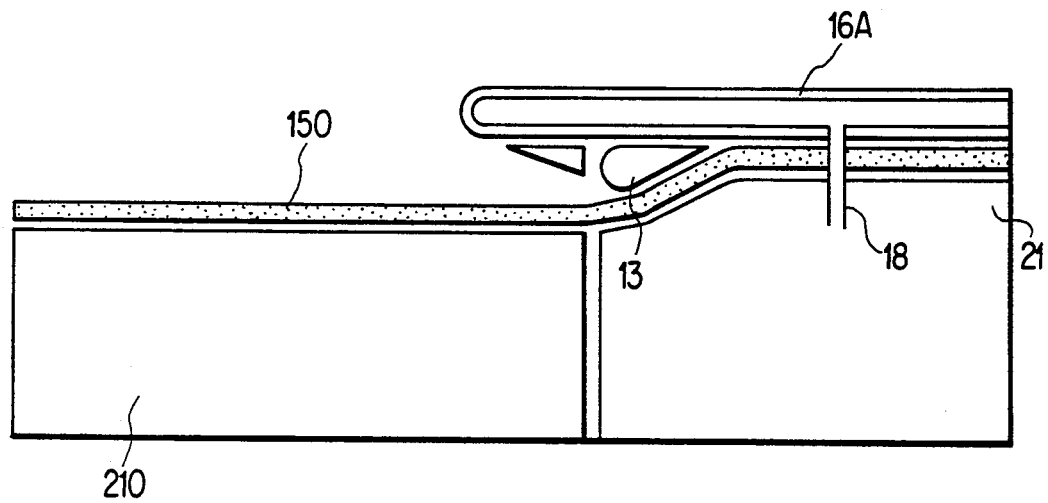
Figure 5:
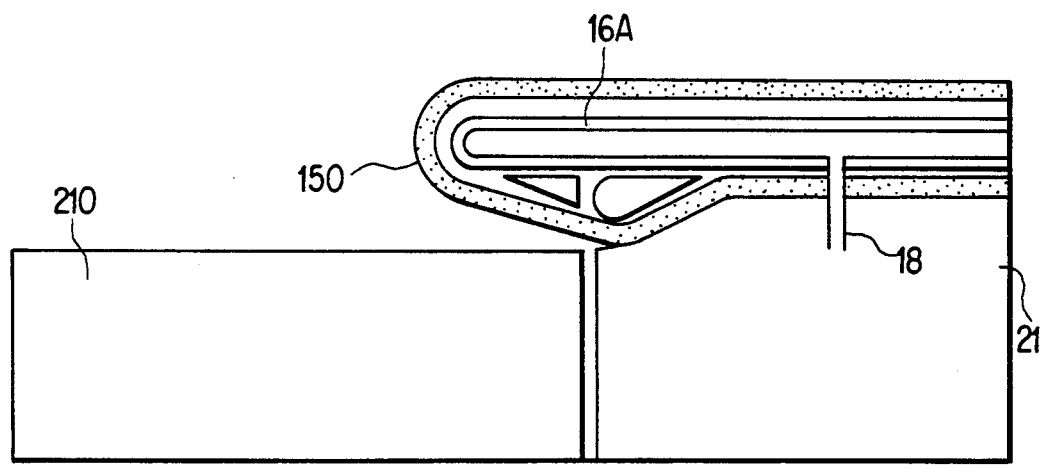
Figure 6:
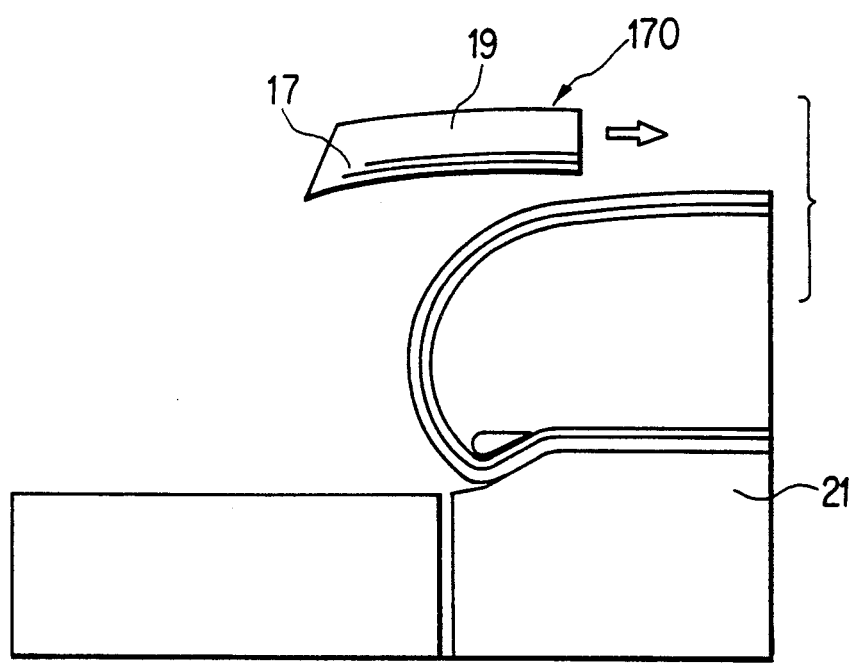

In a variant of the production process, interior rubber 16 is replaced with a chamber 16A constituting both the air chamber of the future tire, and the shaping membrane as well as the molding and vulcanizing membrane. This chamber 16A is made separately and previously according to well-known techniques for air chambers or shaping/vulcanizing membranes. It is preferably prevulcanized to guarantee a good fluidtightness of the chamber, subjected later to an inflation pressure, first weak for the shaping called for by the production of the blank (before fitting of the belt plies then high during vulcanization. In FIG. 4, it is seen that this chamber 16A is placed above bead wires 13. This chamber 16A must be treated so as to facilitate its gluing to the other constituents of the tire. Therefore, demolding agents should not be used on the exterior wall of chamber 16A. The rest of the production is similar. In FIG. 5, it is seen that complex 150 is turned over to cause it to adhere correctly to chamber 16A, the welding by superposition of the carcass ply being placed approximately in the center of the tire.

Figure 7:
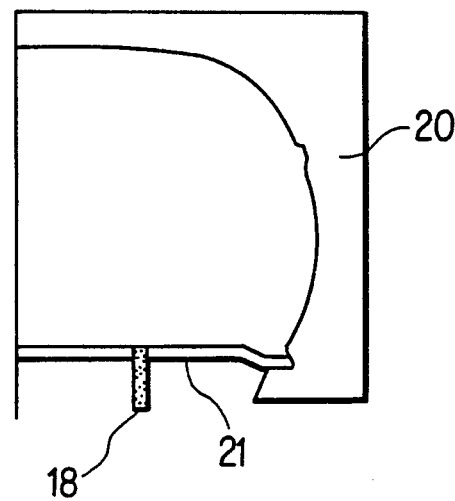

FIG. 7 represents the molding and vulcanizing phase. Rim 21 closes mold 20 on the radially interior side. Through valve 18, the interior of the tire is subjected to a suitable molding pressure, and all the calories are applied from the outside.

With the type of bead wire that has been described above, it is possible to use wires 131 constituting bead wire 13 as an antenna for communication between the vehicle and the control elements of the tire that can be placed on the inside of the tire.

Figure 8:
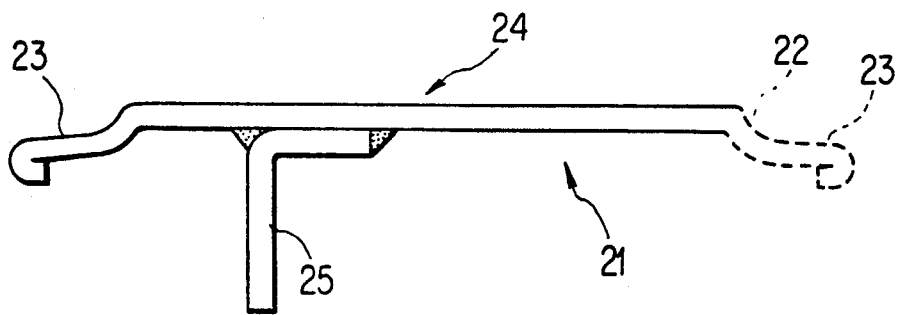
FIGS. 8–10 illustrate rims that can be used to produce the invention.
Figure 9:
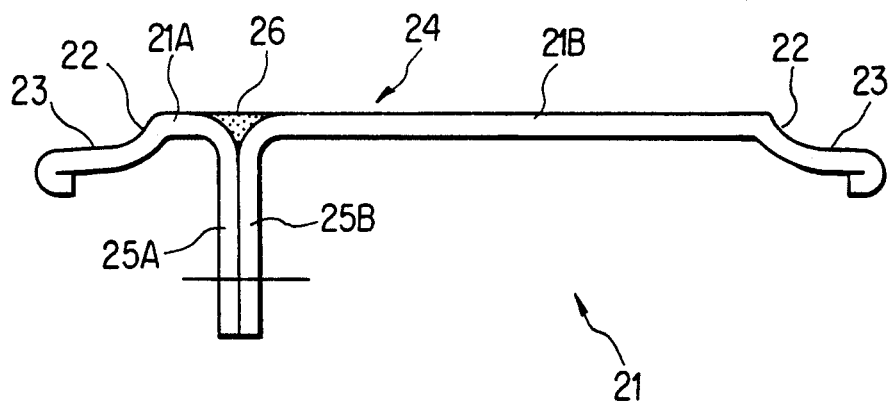
Figure 10:
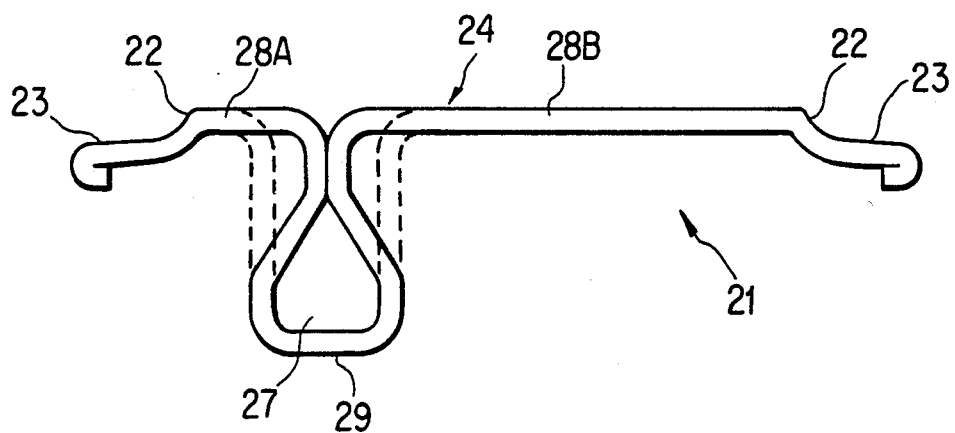

FIGS. 8, 9 and 10 illustrate different possible embodiments for the rim. In this invention, rim 21 should, preferably, exhibit an approximately plane cylindrical surface 24 between the shoulders, this to serve as support for the elements of the tire, particularly during production. In addition, since seats 23 of rim 21 are situated at a level radially lower than the level of the shoulders, it is necessary to provide an additional element to be able to fasten the rim to a disk or to a hub. The different variants illustrated in the figures give different possible solutions.

It is possible to fasten, by welding, a runout 25 to the rim, and after positioning of runout 25, to push back the metal to obtain second rim seat 23 represented in broken lines in FIG. 8. In FIG. 9, it is seen that the rim is obtained by assembly of two half-rims 21A and 21B, each comprising a runout 25A and 25B. These two half-rims 21A and 21B are assembled by several welding points 26 which must assure the sufficient mechanical strength, but must not necessarily make a fluidtight strip, the fluidtightness of the tire chamber being totally assured by the tire itself of the closed torus type. In this variant, the fastening of the rim to the hub or to the disk, can be assured thanks to the two runouts 25A and 25B.

Finally, a last variant is illustrated in FIG. 10, where it is seen that, at an intermediate stage of the production, rim 21 has a recess 27 intended to preshape the runouts for connection with the disk, the recess being plugged at the end of production by relative axial proximity of the two cylindrical bearing surfaces 28A and 28B. In this case, it is possible to fasten a disk by welding to the radially lower end 29 of central recess 27, or any other fastening means.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A tire and rim unit comprising a tire which is a closed torus type tire and a rim for supporting said tire, said unit comprising:

a carcass for reinforcing said tire, an interior rubber inside of said carcass, said carcass and said interior rubber forming a closed torus; and a pair of bead wires each of which is positioned on the inside of said carcass and said interior rubber near lateral ends of said rim for tightly securing said carcass between said bead wires and said rim, wherein said rim defines shoulders which axially extend from each of the lateral ends of the rim, and seats which axially extend from the shoulders, such that the pair of bead wires are positioned directly radially outward of the seats and said tire is immobilized on a radially exterior surface of said rim by said bead wires;

wherein, in a cutting plane containing an axis of rotation of said tire and rim unit:

the position of said beam wire in relation to said rim, at each of the lateral ends of said rim, is defined by the shoulder provided on said rim and extended axially outward by the seat, said seat being entirely situated radially at a diameter which is less than a diameter ($\phi_c$) of said shoulder;

a lower diameter ($\phi_t$) of said bead wire which is measured from a radially innermost edge of said bead wire which is adjacent to said carcass is less than the diameter ($\phi_c$) of said shoulder;

said bead wire assumes a shape of said seat of said rim over at least a 45° swept sector which is displaced toward the interior of said rim from a line which is perpendicular to the axis of rotation of said tire and rim unit and dropped from a center of gravity of said bead wire; and an angle $\alpha$, which is an angle measured in relation to a straight line perpendicular to said axis of rotation that a first line tangent to said carcass makes at a position where said first tangent line and carcass leaves contact with said bead wire on an axially exterior side of said tire, being less than an angle $\beta$, which is an angle measured in relation to a straight line perpendicular to said axis of rotation that a second line tangent to said carcass makes at a position where said second tangent line and carcass leaves contact with said bead wire on an axially interior side of said tire.

2. The unit according to claim 1, wherein said shoulders are connected by a cylindrical zone to form a substantially continuous support in the radial direction, said continuous support defining a substantially constant level.

3. The unit according to claim 1 or 2, wherein said unit further comprises a rubber cushion situated between said pair of bead wires, said rubber cushion being adjacent to said rim and serving as a support for a tread of said tire when said tire and rim unit is used with insufficient pressure.

4. The unit according to claim 3, wherein $\beta$ is between 30° and 80°.

5. The unit according to claim 4, wherein $\alpha$ is equivalent to approximately 30° and $\beta$ is equivalent to approximately 45°.

6. The unit according to claim 5, wherein each of said pair of bead wires comprises a first part which defines a radially inward side of said bead wire, said first part comprising wires which are wound inside said first part.

* * * * *